Aug. 15, 1972  C. E. MORRIS ET AL  3,684,607
MANUFACTURE OF COLLAPSIBLE PACKAGING TUBES
Filed March 24, 1970  3 Sheets-Sheet 1
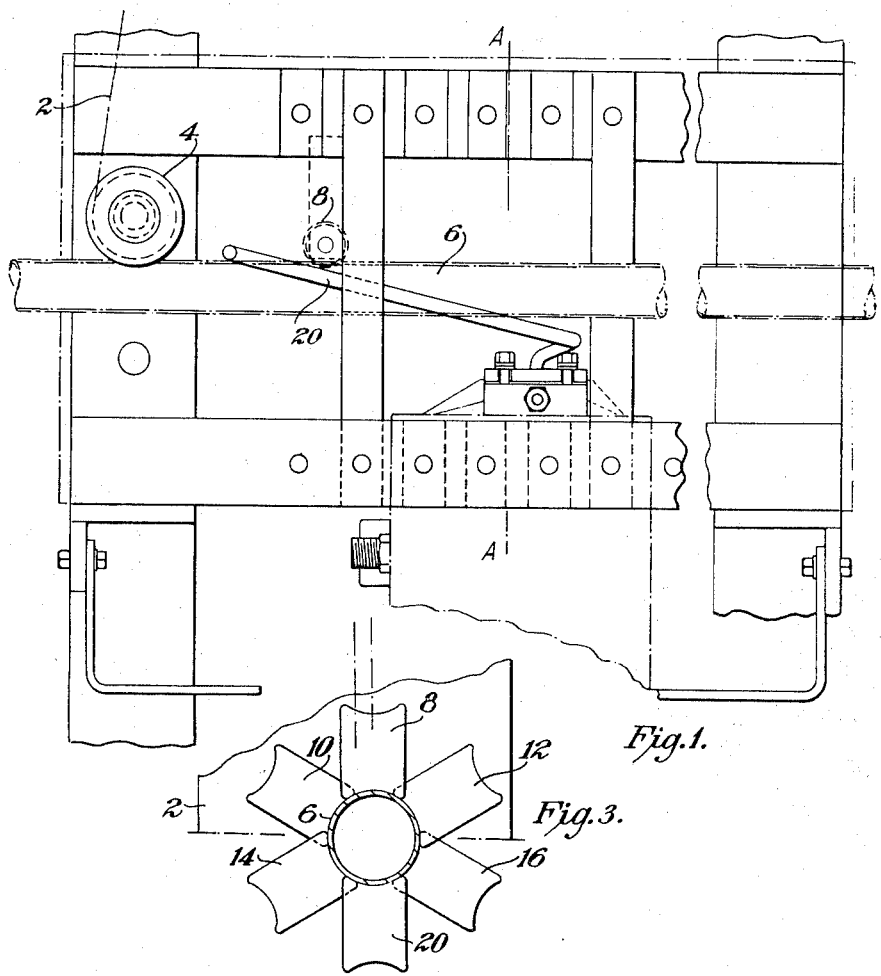

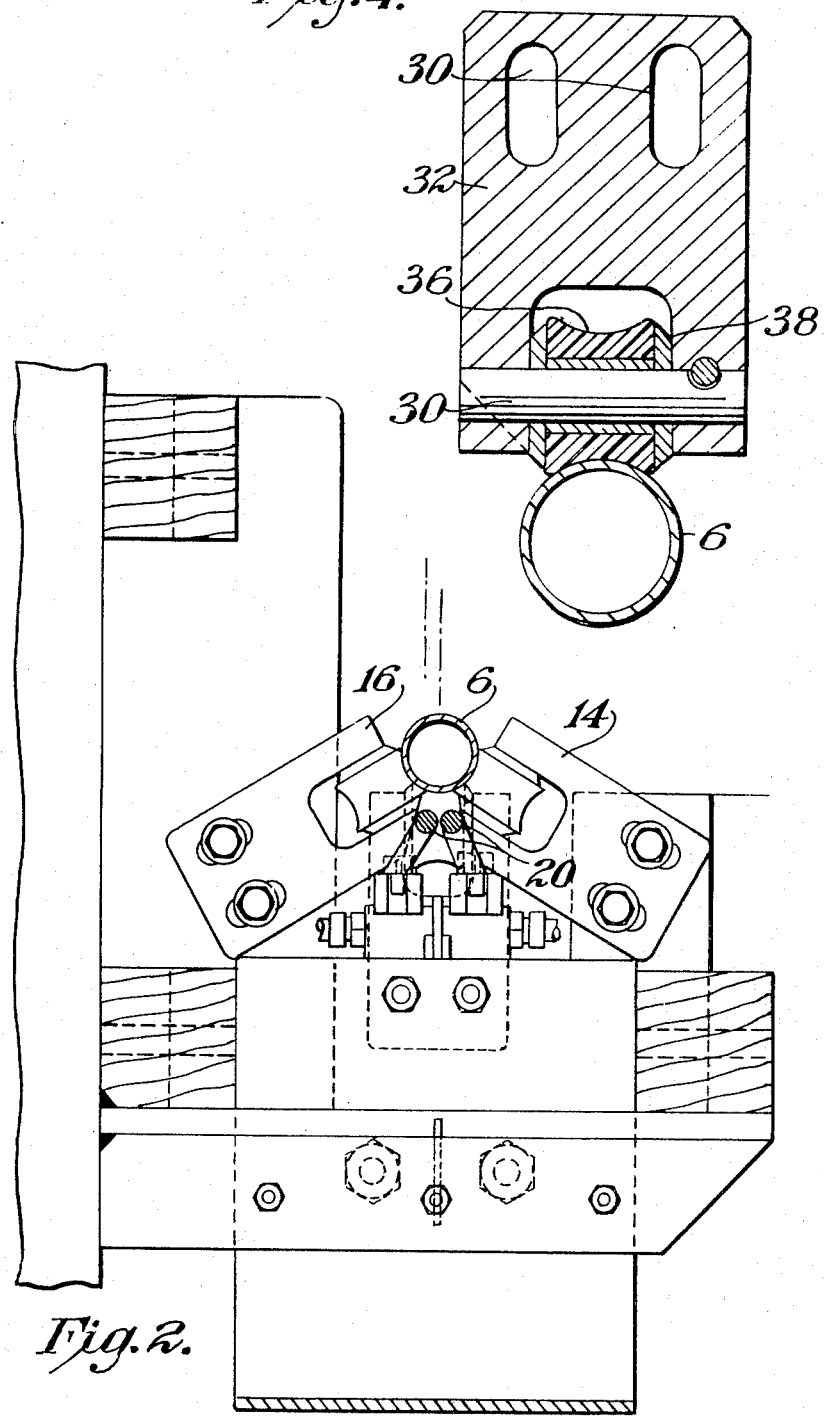

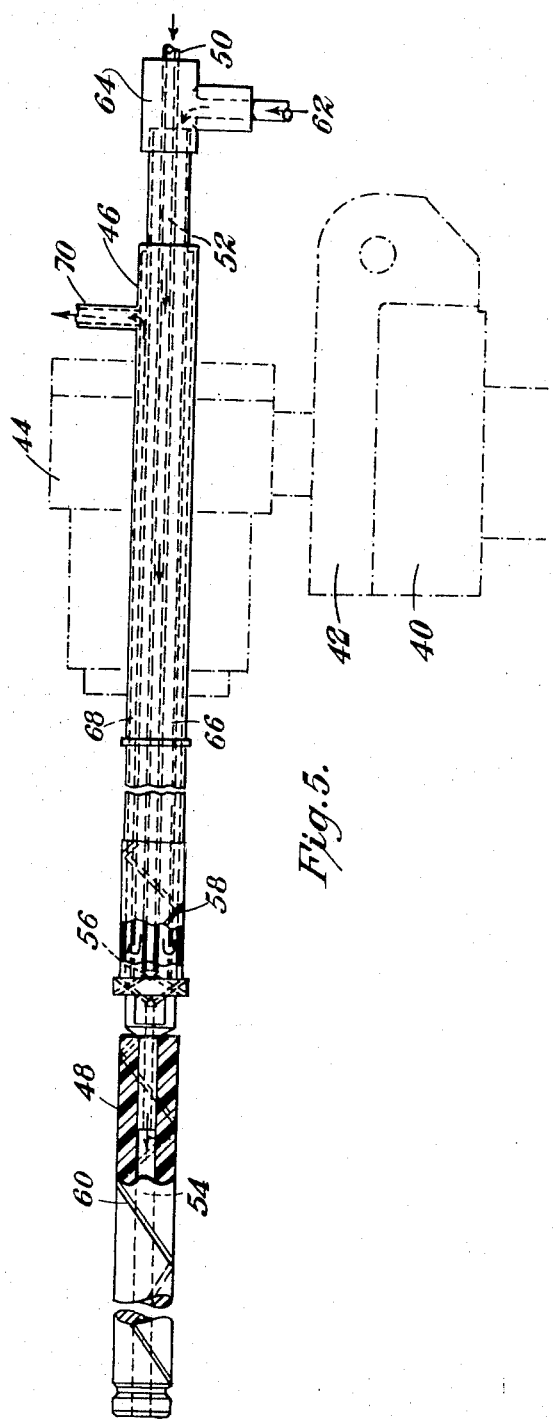

United States Patent Office 3,684,607
Patented Aug. 15, 1972

3,684,607
MANUFACTURE OF COLLAPSIBLE
PACKAGING TUBES
Cecil Edward Morris, 224 Settle St., Great Lever, Bolton, Lancashire, England, and Anthony St. John Rowbotham, 39 Highridge Road, Hemel Hempstead, England
Filed Mar. 24, 1970, Ser. No. 22,348
Int. Cl. B65h 81/04
U.S. Cl. 156—187                17 Claims

ABSTRACT OF THE DISCLOSURE

Apparatus for forming collapsible laminated tubes by wrapping metal foil around a tube of plastics material comprises a mandrel, means for continuously moving, e.g. extruding, a tube of plastics material along the mandrel, at least one supply of metal foil in continuous strip form, means for wrapping the metal foil around the tube as the tube moves along the mandrel, means, e.g. one or more induction coils, for inducing heat into the metal foil, means for pressing the heated foil against the tube so as to cause the foil to adhere to the tube to form a laminated tube, and cutting means for cutting the laminated tube into required lengths.

---

This invention relates to collapsible or flexible tubular containers, and is especially concerned with apparatus for the production thereof.

Collapsible tubes for the packaging of such materials as pastes and liquids are conventionally made of metal, for example lead, tin or aluminum, by impact extrusion from a small disc or slug thereof, the tubes normally having a thin flexible side wall and a somewhat thicker head and discharge nozzle. Tubes of this nature suffer from disadvantages, in that in the first place the thin walls sometimes crack during use of the tubes with the result that the contents thereof are squeezed out at positions other than the nozzle. Furthermore, products having certain properties, for example those which are acid in character such as fluoride-containing toothpaste, react chemically with the metal of the tubes, causing damage to the product and/or to the tube. In order to overcome this latter disadvantage it is known to give the inner wall of the tube a protective coating, for example of an epoxy resin, a hydrocarbon wax such as paraffin or a microcrystalline wax. While this is partially successful it is extremely difficult to obtain a protective coating which completely covers the inside of the tube and is also free from pinholes.

A more recent trend in containers of this general type has been to form the containers entirely of synthetic plastics materials, but again it is known that containers made from synthetic plastics materials such as polyethylene and polyvinyl chloride are unsuitable for containing certain products because although the material may resist attack by these products the permeability of the plastics material permits constituents such as solvents, water vapour and perfumes to migrate outwardly through the tube walls and/or permits oxygen or other gases to penetrate inwardly and spoil the contents of the container. A further major disadvantage of such exclusively plastic tubes is that they are too pliable. Thus, the tube part does not remain collapsed after the expulsion of some of its contents, but tends to expand again once the pressure upon it has been released, air being sucked inwardly through the discharge nozzle.

It has been realised that most of the disadvantages which are present in the use of the two forms of container mentioned above may be overcome by producing a composite container, the container being a laminate comprising an inner layer of plastics material and an outer layer of metal. However, so far no efficient and economically worthwhile method has been available for the production of such composite tubes. For example, it has been proposed to form such a tube by providing a preformed inner plastics tube and attaching to the outside thereof a pre-formed metal sheath. Considerable difficulty is encountered in attaching the pre-formed metal sheath to the plastics tube, since complete accuracy is required in the sizing of the metal sheath, which clearly would be useless if marginally larger or smaller than a perfect fit. Furthermore, the composite tube product is found to be unattractive to the consumer since the metal sheath must be of a substantial thickness, in order for it to be formed, and this means that the composite tube is relatively heavy.

It has also been proposed to form a collapsible metal tube in the normal way, i.e. by impact extrusion, and then to insert into the tube from the bottom end a flexible sleeve of an inert material such as polyethylene. For such a tube to have any merit from the commercial point of view the inner sleeve must be a close friction fit with the outer metal tube. Quite clearly, having regard to the thinness of the plastics sleeve which must necessarily be involved, it is virtually impossible, on a commercial production scale, accurately and effectively to force the inner plastic sleeve into the outer metal tube.

The most successful plastics/metal composite tube of which we are aware is one formed from a pre-formed laminated sheet material comprising metal foil sandwiched between layers of heat-sealable thermoplastic material. The bodies or tubular parts of such containers are made by wrapping the laminated sheet around a forming mandrel and heat-sealing overlapping portions of the sheet to form a tubular body. These tubes are relatively easy to manufacture, but they have the disadvantage that it is impossible to form them without internal seams at the positions of the longitudinal overlapping edges of the laminate. The presence of such seams in contact with the contents of the tube is an acute disadvantage, since at best seepage of the contents will occur, and at worst the components of the tube will tend to delaminate. A further disdavantage to be found with tubes having bodies wound from flat strip or sheet is that the foil layer necessarily extends the whole length of the body. It is normal to close collapsible tubes at the base after filling with product by means, for example, of heat-sealing apparatus or by ultra-sonic vibrations and the foil, extending as it does over the whole length of the tube, can seriously impair the operation and effectiveness of such sealing methods and the seals thus formed.

We have recently proposed a process for the production of collapsible or flexible composite tubular containers whereby plastic-metal containers may be produced, which process involves wrapping a layer of metal foil around a preformed tube of plastics material and causing the metal foil to adhere to the plastics tube. The present invention provides apparatus for producing such collapsible tubes, and also a modification of the basic method of forming such tubes.

According to the present invention apparatus for forming collapsible laminated tubes by wrapping metal foil around a tube of plastics material comprises a mandrel, means for continuously moving a tube of plastics material along the mandrel, at least one supply of metal foil in continuous strip form, means for wrapping the metal foil around the tube as the tube moves along the mandrel, means for inducing heat into the metal foil, means for pressing the heated foil against the tube so as to cause the foil to adhere to the tube to form a laminated tube, and cutting means for cutting the laminated tube into required lengths.

Also a method for the production of a collapsible laminated tube comprises continuously moving a tube of plastics material along a mandrel, e.g. by continuously extruding a tube of the material onto a mandrel integral with the extruder, continuously wrapping metal foil in strip form around the plastics tube as it moves along the mandrel, inducing heat into the metal foil, pressing the heated foil against the tube so as to cause the foil to adhere to the tube to form a laminated tube, and cutting the laminated tube into the required lengths.

The tube of plastics material is preferably wrapped with metal foil immediately after it has been formed, and for this purpose it is preferred that the mandrel be an integral part of the tube extrusion apparatus. Thus, if the extruder head by means of which the plastics tube is produced is provided with a tubular extension piece acting as the mandrel, the plastics tube may be extruded straight onto the mandrel. This may be accomplished most readily if the extruder is one provided with a right-angled head, the mandrel being mounted within the crosshead of the extruder.

The extruder head itself will normally be provided with cooling means, for example for air and/or water cooling, and since the plastics tube must be cool enough to be able to receive the metal foil wrapping without deformation the mandrel is preferably provided with cooling means also. This may suitably take the form of an internal bore or bores for the circulation of cooling water, and alternatively or additionally may include an internal bore or bores for the passage of cooling air. Preferably, when air cooling is used, the exterior of the mandrel is formed with a spiral groove which communicates with the internal air passage. By this means cold air admitted to the interior of the mandrel at the rear end thereof will escape through a communicating port at the forward end of the mandrel to the spiral groove on the outside of the mandrel, and will have the effect both of cooling the inside of the plastics tube directly and also of providing a very small "cushion" of air between the mandrel and the tube being moved therealong, which cushion assists in maintaining the shape of the tube as it is being wrapped with the metal foil.

The supply of metal foil is preferably a single coil of metal foil having a width equivalent to or slightly exceeding the outer circumference of the plastics tube. This is wrapped round the plastics tube as the latter passes along the mandrel so as to form a longitudinal abutting or slightly overlapping seam. Alternatively two or more coils of metal foil may be wrapped around the tube, each of which has a width equal to one-half, one-third etc. of the circumference of the tube. When two coils are used, two longitudinal seams are produced, and so on. If desired, the foil may be wrapped helically around the plastics tube.

The heating means for inducing heat into the foil will be one or more radio frequency induction coils suitably disposed in relation to the foil to achieve the required heating thereof. The heating required of the induction coil(s) is that which will cause the temperature of the foil to be raised sufficiently for it to bond to the outside of the plastics tube. Preferably the foil is provided, e.g. by roller- or extrusion-coating, with a surface coating of a thermoplastic material, such as polyethylene or "Surlyn," which, when heat is induced into the foil, is plasticised to an extent such that it will bring about bonding between the foil and the plastics tube when the foil is pressed against the tube. In a preferred case the metal foil forms part of a composite laminate comprising the following layers, in surface to surface order: 1, a heat-sensitive adhesive or a thermoplastic material such as polyethylene or "Surlyn," the thickness of the layer not exceeding 0.001 inch; 2, the metal (e.g. aluminium) foil layer, having a thickness not exceeding 0.001 inch; 3, a layer of paper, which may be decorated, suitably having a weight of 40 gms./sq. metre; 4, a layer, suitably not exceeding 0.001 inch in thickness, of polyethylene or another thermoplastic material. If desired there may be a thin layer of adhesive between layers 2 and 3. When we refer herein to "foil" we include composite laminates of which the metal foil is a component.

The foil may be heated before it is wrapped around the tube, but preferably heating takes place after wrapping. The induction coil is therefore preferably situated so that it encircles the mandrel (which should of course be of an insulating material) and tube, and suitably it lies at an angle to the mandrel. That is to say, the coil preferably lies in a plane which is at an angle to the horizontal plane including the axis of the mandrel. If desired, an auxiliary coil may be placed adjacent the path of travel of the foil from the coil to the tube. The induction coil or coils are suitably connected to a high frequency generator capable of supplying radio frequency currents in the 1–3 megacycle range. A preferred frequency is 2 megacycles, and suitably the generator has a kw. rating of 1½ to 6 kw. The kw. rating determines the maximum amount of energy that can be transmitted to the coil and hence the magnitude of the electromagnetic eddy currents induced in the metal foil layer to be wrapped around the plastics tube.

To enhance the receptiveness of the outer surface of the plastics tube for the subsequently applied foil wrapping, the surface is preferably activated, e.g. by a flame treatment or corona discharge, prior to the application thereto of the foil.

The foil (or foil-containing laminate) is preferably wrapped around the plastics tube by means of a series of cooperating rollers, which may be similar in action to those rollers used for forming metal pipes from sheet metal strip.

The pressure is applied to the foil, to press it firmly against the plastics tube, preferably by means of a number of sets of two rollers, the two rollers of each set making between them an obtuse angle of about 120°. Thus, in a typical construction strip metal (e.g. tin or aluminium) foil is led from a coil situated above a mandrel along which is being drawn (e.g. by draw-off rolls or belts) a tube of plastics material. The foil is wrapped progressively around the moving tube to produce a longitudinal seam at the bottom of the tube. (It will be appreciated that a top seam will be obtained if the foil is led from a coil situated beneath the mandrel.) The tube and applied foil then pass through the force field of the coil and whilst so passing are subjected to pressure from a roller mounted so as to press the top of the assembly, then two rollers mounted at 120° pressing the lower sides of the assembly, then two rollers mounted at 120° pressing the upper sides of the assembly, and finally a single roller pressing the seam along the bottom of the assembly.

These pressure rollers suitably have arcuate pressing surfaces (i.e. they are of the type known as "hourglass" rollers), so that the foil is pressed firmly against the tube over the whole of its surface. The pressure rollers are all preferably of an insulating material. Thus, the pressing surfaces themselves may be of a silicon rubber, mounted in P.T.F.E. bearings in a "Tufnol" holder. The roller axles may be of nylon.

In the preferred use of the apparatus of this invention, a tube of plastics material is continuously extruded from the head of a right-angled head extruder along an internally cooled mandrel disposed through the crosshead of the extruder. As it moves along the mandrel under the influence of the extruder screw and haul-off rolls disposed at the end of the mandrel remote from the extruder, the tube is wrapped with metal foil, or suitably a metal-foil-containing laminate. Heat is induced into the foil, which is pressed against the plastics tube by means of the rollers and is caused to adhere to the tube to form a composite laminated tube. On cooling of the laminated tube, it is divided, for example by means of a guillotine or other shearing mechanism, into tubes of the required length.

These tubes are then provided at one end with a shoulder and nozzle portion, which may be friction (spin) welded to the tubes, and also if desired with a closure cap. The tubes are then ready for filling through the end opposite the shoulder and nozzle.

The thermoplastic material used to form the continuously extruded tube may be any of the thermoplastics normally used in the manufacture of plastics tubes or containers. Examples include olefin polymers and copolymers such as the polyethylenes, polypropylene and ethylene-propylene copolymers; styrene polymers and copolymers; polyvinyl chloride, polycarbonates, polyamides such as nylon and cellulose acetate.

In the drawings, which illustrate apparatus in accordance with the invention for manufacturing collapsible laminated tubes, FIG. 1 is a side elevation of the apparatus, showing most of the essential parts for wrapping the foil around the extruded tube and heating it;

FIG. 2 is a section on line A—A of FIG. 1 showing the position of one set of pressure rollers;

FIG. 3 is a diagram showing the sequence in which the various pressure rollers act to wrap the foil around the tube and bond it thereto;

FIG. 4 is a sectional diagram showing the construction of one of the pressure rollers; and FIG. 5 is a part-sectional diagrammatic elevation showing the disposition of the mandrel in the crosshead of an extruder and the system for cooling the mandrel.

With reference to FIGS. 1 and 3, strip metal foil 2 (suitably a composite foil) is fed from a supply coil (not shown) around a feed roller 4 of insulating material such as "Tufnol," and is wrapped around a tube 6 of thermoplastic material being drawn along a mandrel (inside the tube 6—see FIG. 5). The wrapping is effected by rollers 8, 10 and 12, 14 and 16, and 18, disposed in that order along the tube. Only roller 8 is shown in FIG. 1, but FIG. 3 illustrates the manner in which the various rollers are disposed along and about the tube 6. Thus, it will be seen that roller 8 acts on the top of the tube, rollers 10 and 12 on the upper sides, rollers 14 and 16 on the lower sides, and roller 18 on the bottom, so as progressively to wrap the foil 2 around the tube 6.

At the same time as the foil is being wrapped around the tube it is also being subjected to heating by means of an induction coil 20 which, as will be seen most clearly from FIG. 1, surrounds the tube and lies at an angle thereto. The coil 20 is connected to an R.F. generator, and it induces sufficient heat into the foil to soften the thermoplastic material adjacent the foil (i.e. a coating on the foil or the surface of the plastics tube or both) such that under the applied pressure the foil and the tube are bonded together.

The third pressure rollers to contact the foil, rollers 14 and 16, are shown in detail in FIG. 2, and FIG. 4 illustrates the construction of the roller heads. Each roller is rotatably mounted, e.g. on a P.T.F.E. pin 30, in a holder 32 of, e.g., "Tufnol" or other insulating material. The holder 32 has elongated holes 34 in order that it may be adjusted so as to be useful in the production of tubes of various diameter. The arcuate surface 36 of the roller is preferably of a silicon rubber (e.g. one having a Shore hardness of 70), and the roller is centralised in its mounting by means of P.T.F.E. washers 38.

The tube 6 of thermoplastic material is freshly extruded from a right-angled head extruder indicated in FIG. 5 in dot-and-dash lines. The extruder flange 40, the crosshead flange 42 and the crosshead 44 are illustrated. The mandrel is basically in two parts, a first part 46 disposed in the crosshead 44, and about which thermoplastic material is extruded, and a second part 48 attached to the first part exteriorly of the crosshead, and about which the wrapping operation of the foil on the extruded tube takes place. The part 48 is made of insulating material such as "Tufnol."

The part 46 of the mandrel is cored for air and water cooling. Air, fed from a compressed air supply through a copper tube 50, passes along passages 52 and 54 in parts 46 and 48 respectively, and also, via outlet port 56, along spiral grooves 58 and 60 formed on the external surfaces of mandrel parts 46 and 48 respectively. Similarly, cooling water is fed into mandrel part 46 through an inlet 62 in a T-piece 64, and circulates through passages 66 and 68, finally leaving mandrel part 46 via an outlet 70.

Tube 6 is extruded around mandrel part 46 and moves therealong, being cooled by air and water passing through passage 52 and spiral groove 58, and passages 66 and 68 respectively. By the time the tube has passed onto the "Tufnol" mandrel part 48 it has cooled sufficiently not to undergo deformation on being wrapped with the foil material 2 and pressed by the pressing rollers. The composite laminated tube is hauled off the mandrel and is sheared (by means not shown) into the required lengths. Thereafter each length is provided with a shoulder and nozzle, and is ready for filling.

What we claim is:

1. Apparatus for forming collapsible laminated tubes by wrapping metal foil around a continuous seamless tube of plastics material, comprising a mandrel, means for extruding a continuous seamless tube of plastics material onto said mandrel, means for continuously moving the tube of plastics material along said mandrel, at least one supply of metal foil in continuous strip form, means for wrapping the metal foil around the tube of plastics material as said tube of plastics material moves along the mandrel, means for inducing heat into the metal foil, means for pressing the heated foil against the tube so as to cause the foil to adhere to the tube to form a laminated tube, and cutting means for cutting the laminated tube into required lengths.

2. Apparatus as claimed in claim 1 wherein the mandrel is an internally cooled mandrel.

3. Apparatus as claimed in claim 2 wherein the mandrel is provided with at least one internal bore for the passage of cooling water.

4. Apparatus as claimed in claim 2 wherein the mandrel is provided with at least one internal bore for the passage of cooling air.

5. Apparatus as claimed in claim 4 wherein the bore for the passage of air is communicated with a spiral groove formed on the exterior of the mandrel.

6. Apparatus as claimed in claim 1 wherein said means for feeding a continuous seamless tube of plastics material onto the mandrel comprises a right-angled head extruder having a crosshead wherein said mandrel is disposed within the crosshead of said right-angled head extruder.

7. Apparatus as claimed in claim 1 wherein the means for moving the tube along the mandrel includes haul-off rollers.

8. Apparatus as claimed in claim 1 wherein the heat inducing means comprises at least one induction coil mounted so as to encircle the mandrel downstream of the position at which the metal foil is wrapped around the tube of plastics material moving therealong.

9. Apparatus as claimed in claim 8 wherein said at least one coil lies at an angle with respect to the mandrel.

10. Apparatus as claimed in claim 1 wherein the means for pressing the heated foil against the tube comprises a number of arcuate-surfaced rollers.

11. Apparatus as claimed in claim 10 wherein the rollers are arranged in pairs along the length of the mandrel, the obtuse angle between the rollers of each pair being about 120°.

12. A method for the production of a collapsible laminated tube comprising extruding a continuous seamless tube of plastics material onto a mandrel and continuously moving the tube of plastics material along the mandrel, continuously wrapping metal foil in strip form around the plastics tube as it moves along the mandrel, inducing heat into the metal foil, pressing the heated foil against the tube so as to cause the foil to adhere to the tube to form a laminated tube, and cutting the laminated tube into the required lengths.

13. A method as claimed in claim 12 wherein the continuous seamless tube of plastics material is fed onto the mandrel by continuously extruding the tube of plastics material along a mandrel integral with the extruder.

14. A method as claimed in claim 12 wherein the metal foil is a component of a composite foil.

15. A method as claimed in claim 12 wherein the surface of the plastics tube is activated prior to the wrapping therearound of the metal foil.

16. A method as claimed in claim 13 wherein said surface is activated by subjecting it to a flame treatment.

17. A method as claimed in claim 15 wherein said surface is activated by subjecting it to a corona discharge.

References Cited
UNITED STATES PATENTS

| | | | |
|---|---|---|---|
| 3,524,779 | 8/1970 | Masters et al. | 156—195 X |
| 3,385,179 | 5/1968 | Roe | 156—195 X |
| 1,985,997 | 1/1935 | Keernan | 18—51 |
| 3,376,180 | 4/1968 | Larson et al. | 156—195 |
| 3,400,029 | 9/1968 | Mesrobian et al. | 156—195 X |
| 3,574,034 | 4/1971 | Harvey et al. | 156—195 |

CARL D. QUARFORTH, Primary Examiner

G. G. SOLYST, Assistant Examiner

U.S. Cl. X.R.

156—192, 195, 244, 429, 432